(12) United States Patent
Gosselin

(10) Patent No.: US 6,367,419 B1
(45) Date of Patent: Apr. 9, 2002

(54) BIRD ANTI-PERCHING DEVICE

(76) Inventor: John Peter Gosselin, 35 rue Beauchemin, St. Basile le Grand, Quebec (CA), J3N 1J3

( * ) Notice: Subject to any disclaimer, the term of this patent is extended or adjusted under 35 U.S.C. 154(b) by 0 days.

(21) Appl. No.: 09/526,144

(22) Filed: Mar. 15, 2000

(51) Int. Cl.7 .............................................. A01K 61/02
(52) U.S. Cl. ..................................................... 119/57.8
(58) Field of Search ........................... 52/101; 119/57.8, 119/61; 43/1; 220/709

(56) References Cited

U.S. PATENT DOCUMENTS

| 1,312,576 A | * | 8/1919 | Rea | 119/61 |
| 2,485,148 A | * | 10/1949 | Fralin | 52/101 |
| 2,938,244 A | * | 5/1960 | Christensen | 52/101 |
| 5,058,335 A | * | 10/1991 | Richter | 220/709 |
| 5,497,585 A | * | 3/1996 | Engler | 52/101 |
| 5,755,179 A | * | 5/1998 | Webber | 119/57.8 |
| 5,918,404 A | * | 7/1999 | Ohba | 43/1 |

FOREIGN PATENT DOCUMENTS

| FR | 2507058 | * 12/1982 | 52/101 |
| GB | 2194566 | * 3/1988 | 52/101 |

* cited by examiner

Primary Examiner—Charles T. Jordan
Assistant Examiner—Jordan Lofdahl
(74) Attorney, Agent, or Firm—Jackson Walker L.L.P.

(57) ABSTRACT

A bird anti-perching device is described having a rotatable cylindrical member extending between two support members and capable of rotating freely if a bird lands thereon, thereby to form an unstable perch. The device can be attached to the ledge of a balcony in a number of ways to prevent birds from alighting on the balcony.

15 Claims, 5 Drawing Sheets

BIRD ANTI-PERCHING DEVICE

FIELD OF THE INVENTION

This invention relates to bird anti-perching devices. More particularly this invention relates to a bird anti-perching device for discouraging birds from perching on a ledge or other surface.

BACKGROUND OF THE INVENTION

Home owners and apartment dwellers often have difficulty with unwanted birds which alight on surfaces such as ledges, railings or fences and leave excrement when they leave.

It is possible to continually clean the affected surface but this does not address the cause of the problem, namely, unwanted birds.

One attempt to solve the problem can be found in U.S. Pat. No. 5,755,179 which utilizes a rectangular flat plate suspended by a rod. The flat plate can rotate and may throw the bird off the plate and prevent it from landing. The plate is positioned so that it rotates eccentrically around its axis.

Problems with this approach have become apparent because birds can perch on a flat plate if they have a second surface on which to balance a foot.

It would be advantageous to provide an anti-perching device which prevents a bird from getting a second foothold.

SUMMARY OF THE INVENTION

It is an object of the present invention to prevent a bird from perching on a ledge or other surface.

Another object of the invention is to provide for a product which can be easily attached to the ledge or other surface.

Accordingly, there is provided a bird anti-perching device for discouraging birds from perching on a surface, comprising two spaced-apart support members and a rotatable cylindrical member extending between said two support members and capable of rotating freely if a bird lands thereon, thereby to form an unstable perch.

According to one embodiment of the invention the support members each have a pin which is respectively inserted in the center of one end of the cylindrical member and another portion which essentially clamps the cylindrical member parallel to the ledge such that it can rotate freely.

The cylindrical member is positioned so that there is not sufficient room for a bird to perch between the cylindrical member and the railing.

It will be understood that the cylindrical member could be of hollow, solid or other construction.

The cylindrical member could be made of a wide variety of materials. For example, the member could be made of wood, plastic, metal or some other material.

The support members could have a second pin immediately opposite the first pin so that a series of cylindrical members could be positioned along a railing.

In some cases it is not possible to use proper clamps to affix the cylindrical member to the ledge and some form of clamping utilizing VELCRO (trade mark) material can be used.

It is also possible to permanently affix the cylindrical member to the ledge through mounted supports instead of using clamps.

Further, the cylindrical member can have internal longitudinal reinforcement to reduce bending of the tube of the cylindrical member.

BRIEF DESCRIPTION OF THE DRAWINGS

Embodiments of the invention will now be described, by way of example, with reference to the following drawings in which.

The same reference numerals are used for like parts throughout.

DETAILED DESCRIPTION

Figure 1:
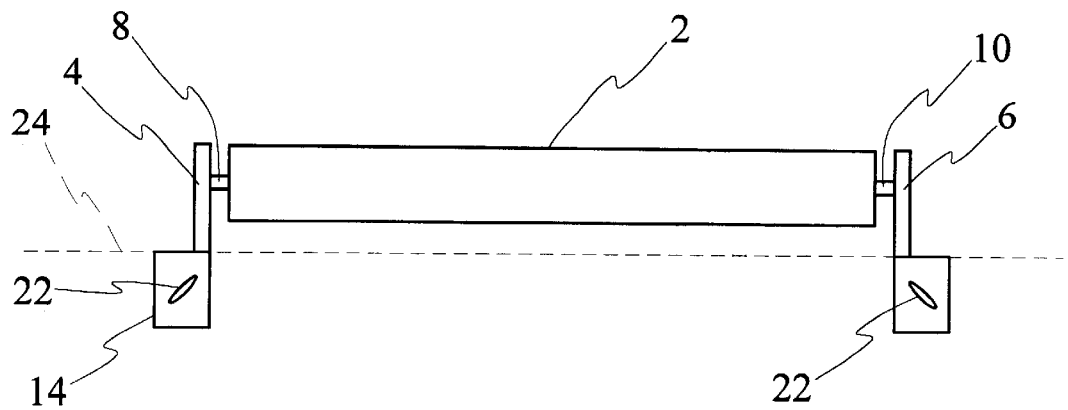
FIG. 1 is a side view of one embodiment of the invention.

Referring to FIG. 1, a rotatable cylindrical member 2 is supported by two spaced-apart support members 4 and 6 and so as to be capable of rotating freely if a bird lands thereon. In this way an unstable perch is provided.

The cylindrical member 2 is supported on support members 4 and 6 by means of centrally located axle rods 8 and 10.

Figure 2:
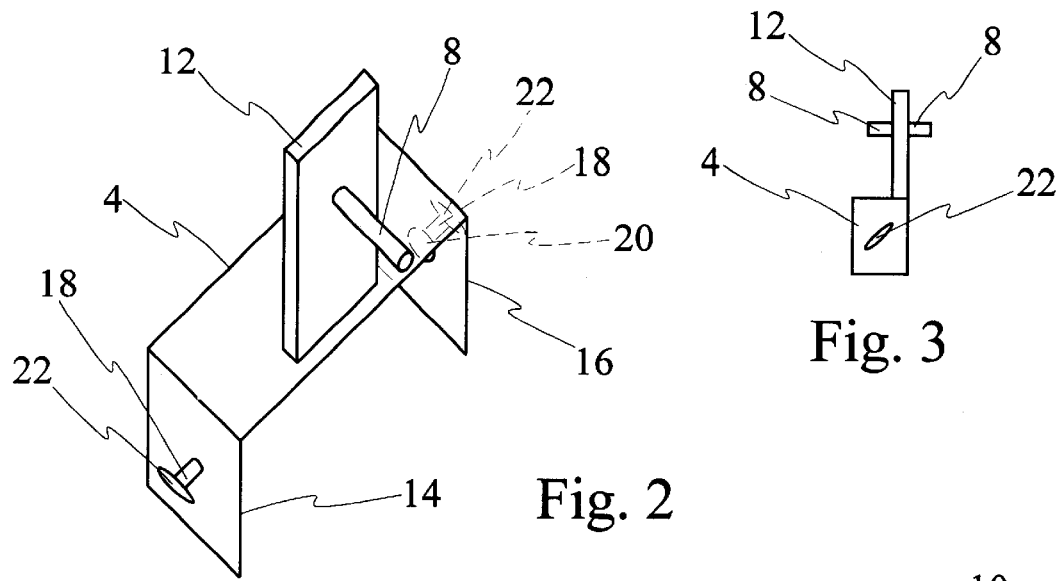
FIG. 2 is a perspective view of a support member shown in FIG. 1.

In FIG. 2, a support member 4 is shown in perspective view to be a clamp in the shape of an inverted U with an upstanding or vertical portion 12 for the axle rod 8. The depending legs 14 and 16 of the U-shaped support member 4 are each drilled in their approximate centre to form a respective internally threaded hole through which an externally threaded rod 18 passes. On its inner end each threaded rod is provided with a plate 20 and on its outer end with a handle portion 22.

In use, the support members 4 are fitted over, for example, the ledge 24 of a balcony, (FIG. 1), of an apartment and the handles 22 turned so that the support members 4 and 6 clamp on the ledge 24. The cylindrical member 2 is thus located above the surface of the ledge 24 at such a position that a bird cannot alight between the cylindrical member 2 and the surface of the ledge 24.

Figure 3:
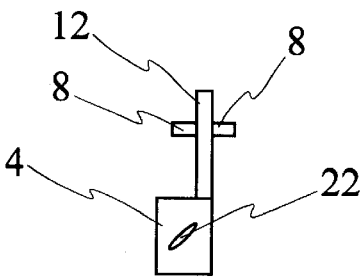
FIG. 3 is an end of a second type of support member.

In FIG. 3, a part of a second embodiment is shown. A support member 4 is made with an axle rod protrusion or pin 8 on both sides of the vertical portion 12 so that adjacent intermediate tubes can be supported by one support or clamp.

Figure 4:
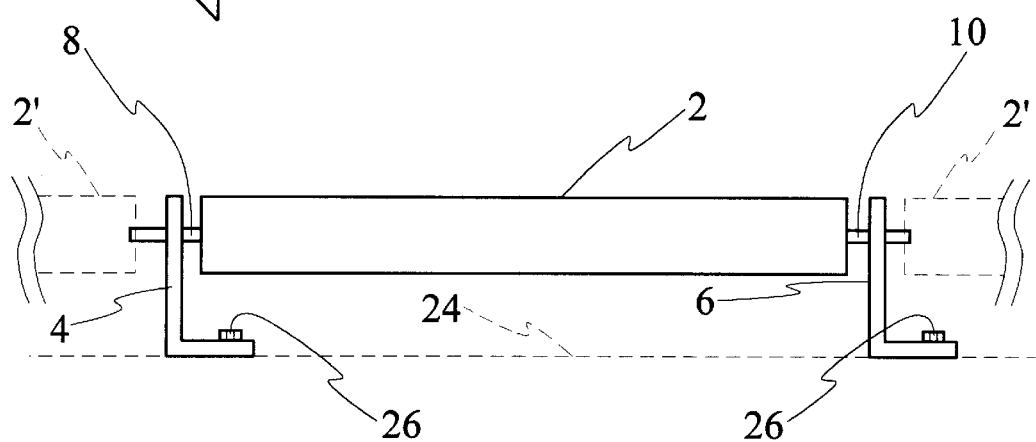
FIG. 4 is an end view to illustrate use of a different type of support member.

In FIG. 4, a still further embodiment is shown in which the support members 4 and 6 are L-shaped in side view and provided with bolts 26 to fasten them to the top surface of the ledge, (usually formed of concrete). FIG. 4 also shows support members 4 and 6 with pins on both sides to support adjacent cylindrical members 2' partially shown in dotted lines.

Figure 5:
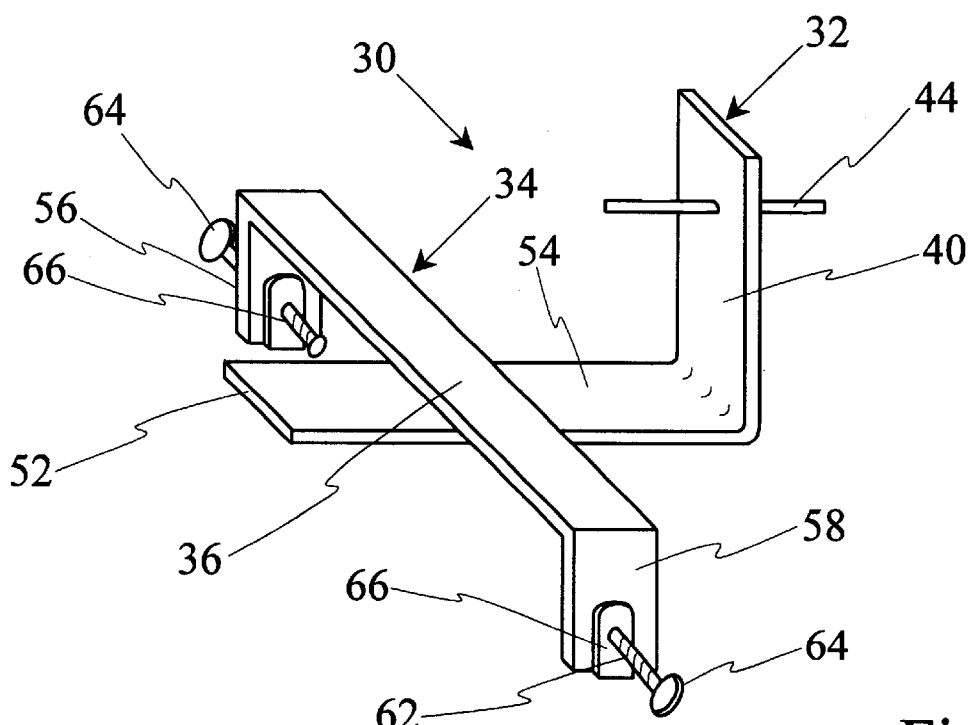
FIG. 5 is a perspective view of a still further modified embodiment of the support member.
Figure 6:
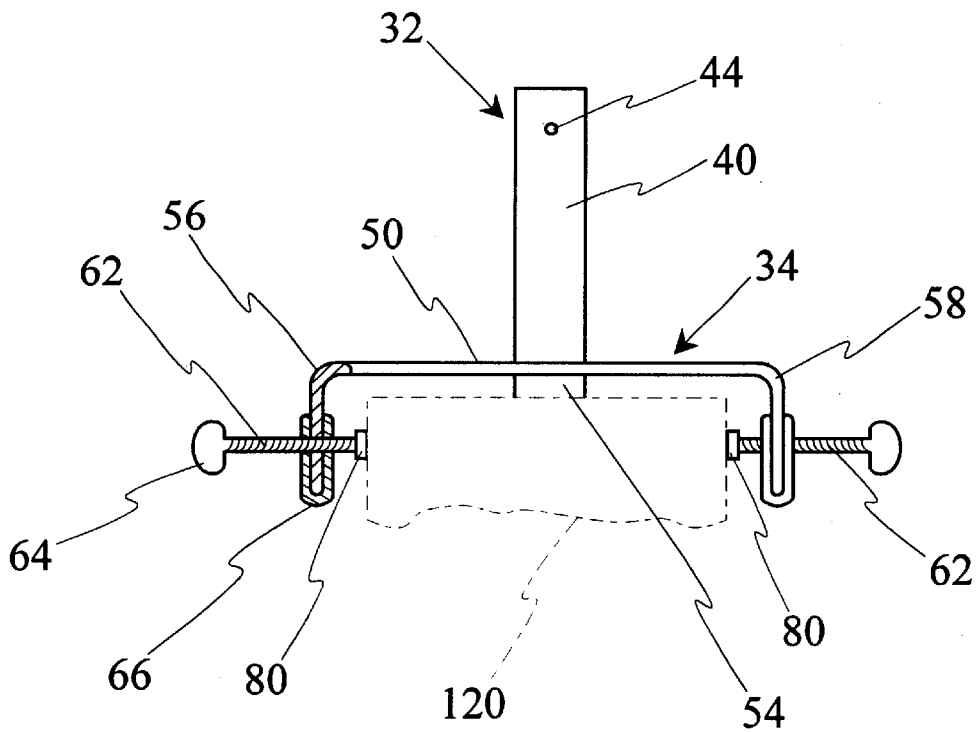
FIG. 6 is an end view of the support member shown in FIG. 5 taken in the direction of arrow A in FIG. 5.

FIGS. 5–10 illustrate a still further and preferred embodiment of the invention. Turning to FIGS. 5 and 6, support 30 comprises L-shaped bracket portion 32 and inverted U-shaped portion 34 which portions are fastened or secured together at 36 by any suitable means, such as spot welding. Upstanding or vertical leg 40 of L-shaped bracket portion 32 has aperture 42 through which pin 44 passes. Pin 44 is secured to leg 40 through a press fit connection and may be made of cylindrical spring steel to facilitate such press fit connection. However, any other means of securing pin 44 to leg 40 is contemplated and appropriate. Bight 50 of U-shaped portion 34 is secured inwardly from end 52 of horizontal leg 54 of bracket portion 32. Downwardly extending legs 56, 58 of U-shaped portion 34 each have apertures 60 for passage of the threaded shank 62 of thumb screw 64, threaded shank 62 being adapted for threaded cooperation with speed nut 66. More particularly, speed nut 66 is a U-shaped clip 68 which attaches over the lower ends 70, 72 of legs 56, 58 and has holes in alignment with aperture 60, the inside hole 74 of clip 68 being threaded and adapted to provide a threaded connection with thumb screw shank 62 in known fashion. A plastic cap 80 is screwed onto the inner end 84 of thumb screw 64.

Figure 7:
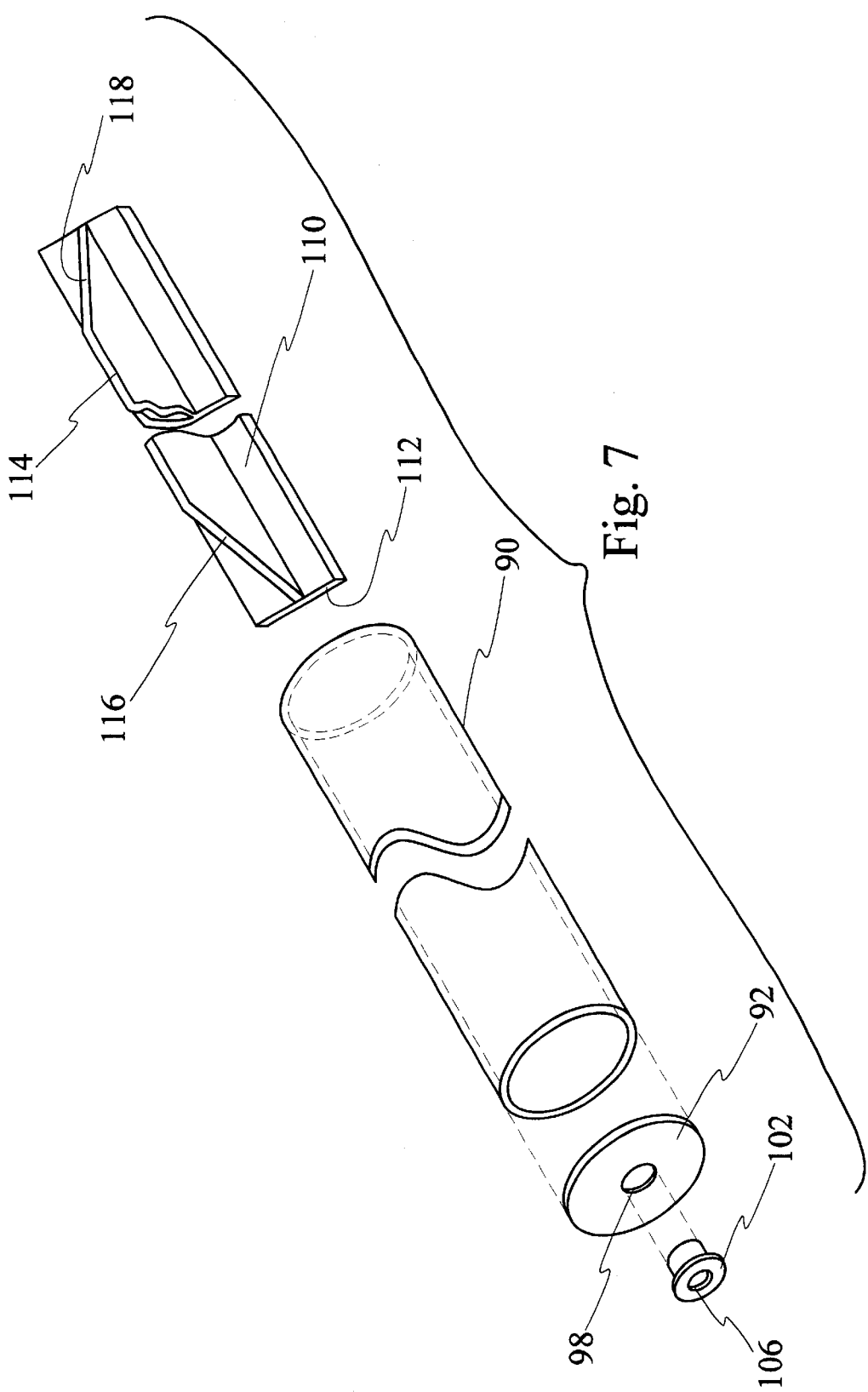
FIG. 7 is an exploded perspective view of a portion of the cylindrical member and internal reinforcement member or element.
Figure 8:
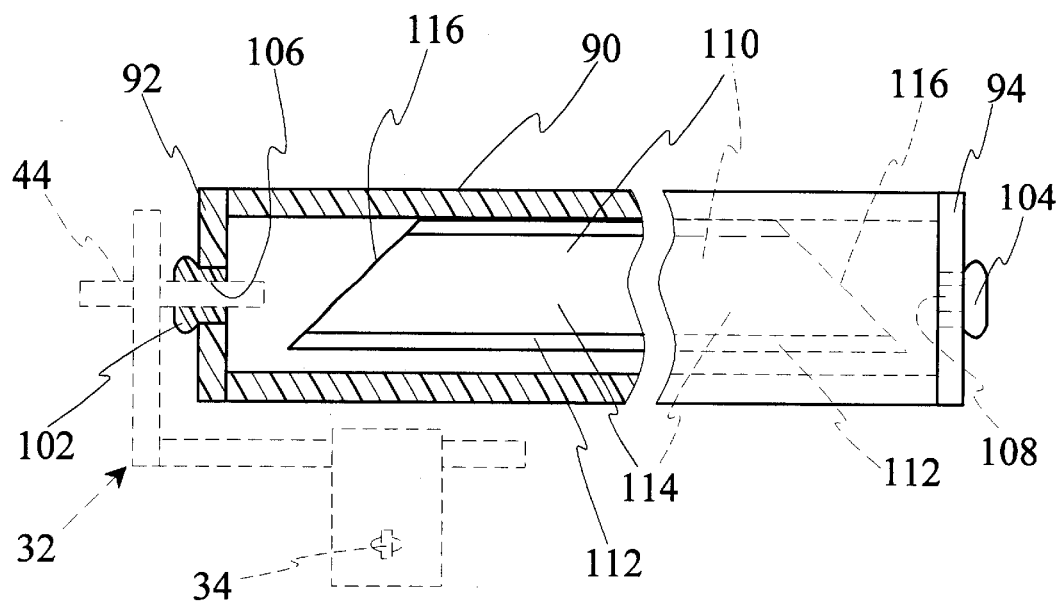
FIG. 8 is an elevational view, partly in section, of the cylindrical member of FIG. 7 assembled.

Turning to FIGS. 7 and 8, there is shown a cylindrical hollow tube 90 of plastic material with circular end caps 92, 94 adapted to be secured by suitable glue or other means to open ends of tube 90, (only end cap 92 being shown in FIG. 7). End caps 92, 94 have coaxial bores 98, 100 into which bushings or bearings 102, 104 are respectively secured, bushings 102, 104 being preferably of a material having a low coefficient of friction, such as a polyacetal plastic. Tube 90 is preferably of an acrylic plastic material. Bushings 102, 104 each have flange 106 and cylindrical portion 108 for securement to cap 92, 94 and in bores 98, 100 thereof as seen in FIG. 8. Bores 106, 108 in bushings 102, 104 are sized to permit free rotation of tube 90 on pins 44.

Preferably, reinforcing element 110 is of a light material such as aluminum, in the form of a "T" or an inverted "T" adapted to be inserted within tube 90 to provide longitudinal reinforcement to the tube 90 between supports 30. This allows for use of longer tubes 90 between supports 30 as well as preventing the tube sagging or bending over time and/or under the weight of a bird or several birds on tube 90, which could cause the cooperation of pins 44 and bushings 102, 104 to become misaligned and bind and lessening free rotation of tubes 90 on pins 44. Element 110 has cross piece 112 and leg 114, leg 114 having tapered ends 116, 118 so that the T-element does not interfere with pins 44 extending into tube 90 through caps 92, 94. T-member is of a size to be relatively easily inserted into tube 90 but with the edges of cross pieces 112 and leg 114 in contact with the interior wall of tube 90. Element 110 is similar to a false ceiling bracket known in the building trade.

Figure 9:
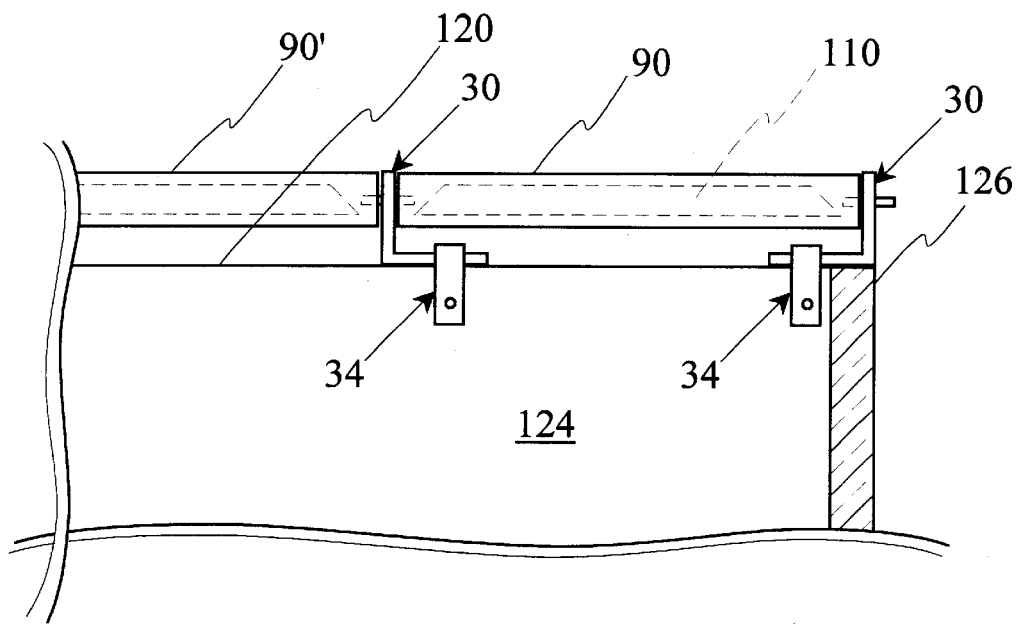
FIG. 9 is an elevational view, partly in section, of the anti-perching device of FIGS. 5–8 assembled and on a balcony railing.

FIG. 9 (and also FIG. 6), illustrate, partly in section, a railing 120 on a balcony 124 to which supports 30 and tube 90 have been assembled. It will be appreciated that the configuration of supports 30 allows the vertical leg 40 to be close to the outer edge 126 of the balcony railing. Further, one intermediate bracket 30 can serve to support two adjacent tubes 90 and 90'.

Figure 10:
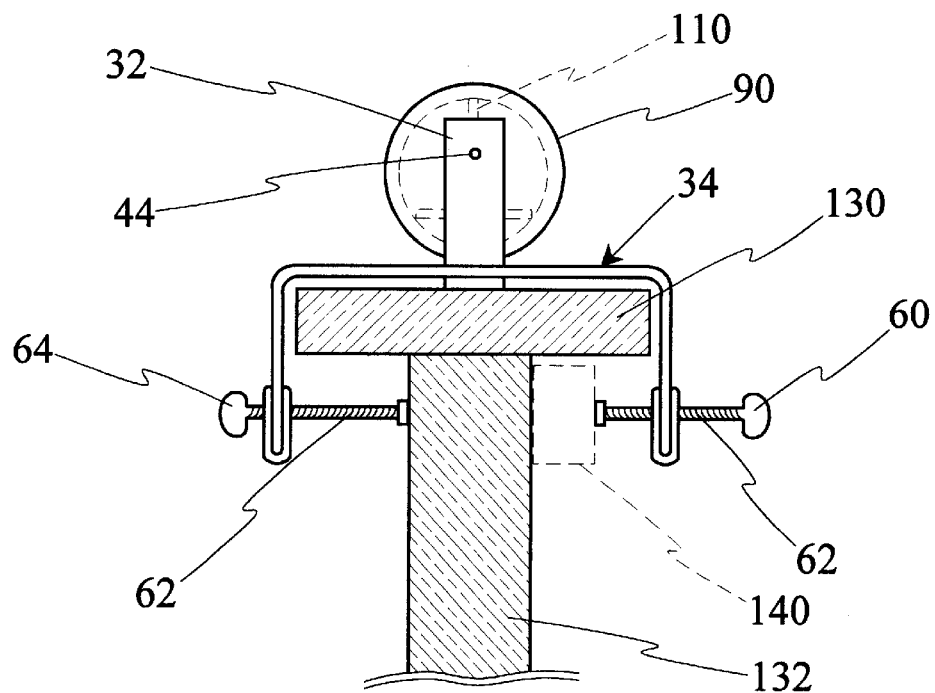
FIG. 10 is an end view, partly in section, showing the device of FIGS. 5–8 on a different railing structure.

FIG. 10 illustrates support 30 assembled to a balcony railing which has an upper horizontal rail 130 wider than the vertical support 132. Thumb screws 64 with shank 62 can be long enough, as shown on the left side of the railing in FIG. 10, to provide adequate clamping of support 30 to the vertical support 132 of railing 130, but if necessary, a block 140 of wood or other material can be inserted as shown in dotted lines on the right side of the vertical railing support 132. Still further, it will be appreciated that U-shaped portion 34 could be constructed whereby the bight 50 is wider and thumb screws 64 and shank 62 located on the legs such that they engage the sides 134 of rail 130.

In a particularly preferred aspect of the support 30, acrylic tube 90 may be 1-½" to 2" in diameter and 6 feet in length with an aluminum T-member inserted into tube 90 and of a length about ¾" short of each end cap. Alternatively, as shown in FIGS. 7 and 8, tapered ends 116, 118 of the T-member can be provided.

As shown in FIG. 5, support 30 has U-shaped bracket 34 located inwardly of end 52 of horizontal leg 54 of L-shaped portion 32. This construction provides for greater stability to the support 30 and lessens any tendency for the support to rotate or turn due to weight on the tubes, particularly when used as an end support as shown in the right side of FIG. 9 adjacent edge 126.

Figure 11:
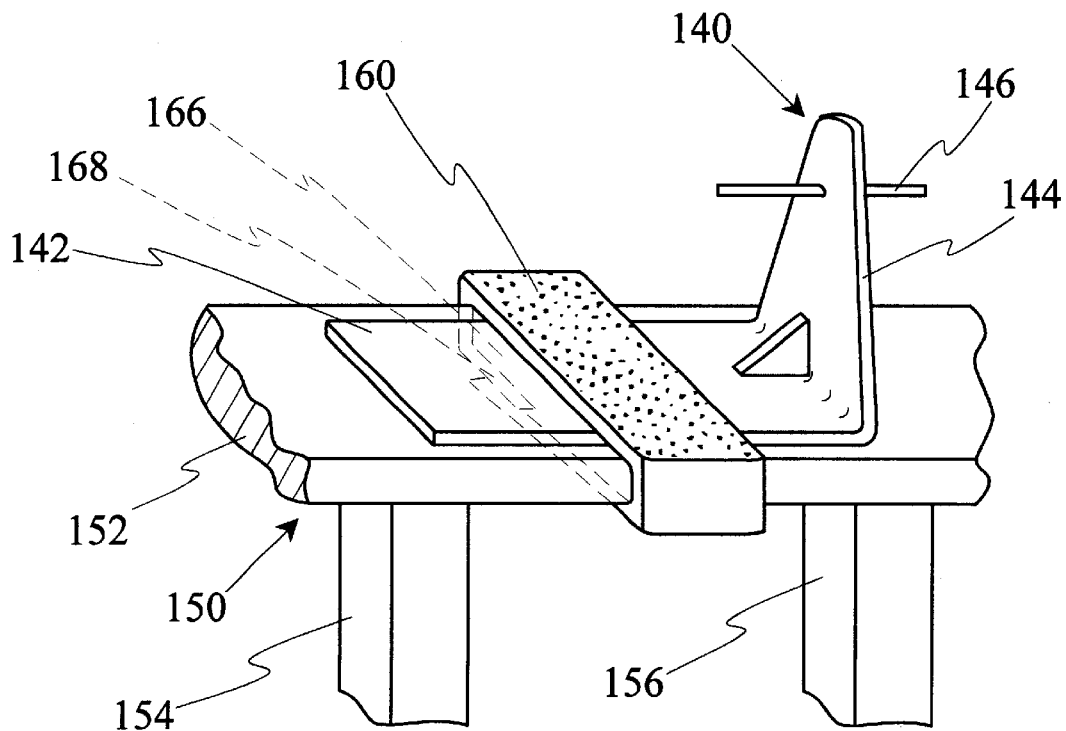
FIG. 11 is a perspective view of another embodiment of a support member of the invention associated with a railing having spaced vertical posts.

Although supports 30 are preferably of coated steel, it will be apparent that supports 30 could be made of a plastic. Turning to FIG. 11, an L-shaped plastic support member 140 with relatively wide horizontal leg 142 and vertical leg 144 is shown, vertical leg 144 having pins 146 and being somewhat triangular in shape.

The balcony railing 150 is of the type having a relatively wide upper railing 152 supported by spaced vertical uprights 154, 156.

Flexible plastic strap 160 is secured to the upper surface of horizontal leg 142 and has ends 166,168, (shown in dotted lines), with fastening means such as hook and loop fabric fastener means. The width and length of horizontal leg 142 relative to the width of railing 152 provides suitable lateral and horizontal support to support member 140 when strap 160 is secured to railing 152. Although a single plastic strap 160 is shown, more than one strap is contemplated and may be suitably used as an alternative to the illustrated embodiment.

It will be readily apparent to a person skilled in the art that a number of variations and modifications can be made without departing from the true spirit of the invention which will now be pointed out in the appended claims.

The embodiments of the invention in which an exclusive property or privilege is claimed are defined as follows:

1. A bird anti-perching device for discouraging birds from perching on a surface, comprising:
   two spaced-apart support members;
   a rotatable cylindrical member extending between said two support members and capable of rotating freely if a bird lands thereon, thereby to form an unstable perch;
   said cylindrical member having opposed ends, each end having a bore therein, each support member further comprising:
   a clamping member having a vertical portion, said vertical portion having a protrusion on one side for insertion into the corresponding bore located in one end of the cylindrical member.

2. A device according to claim 1, wherein the bore in each end of the cylindrical member is located in the centre of each end.

3. A device according to claim 2, including a plurality of said clamping members with a protrusion on both sides of the vertical portion to enable a series of cylindrical members to be positioned adjacent one another.

4. A device according to claim 1, wherein each cylindrical member is located above the surface at such a position that a bird cannot alight between the cylindrical member and the surface.

5. The device of claim 1, wherein said clamping member has a horizontal legconnected to said vertical leg and has a U-shaped portion having a bight portion and two leg portions, the bight portion of the U-shaped portion being secured to the horizontal leg of said L-shaped portion intermediate the free end of the horizontal portion and the vertical leg.

6. A device according to claim 1, wherein said clamping member includes means for detachably clamping said support member to said surface.

7. A device according to claim 1, wherein said surface is part of a railing and said clamping member includes a hook and loop fabric fastening strip to detachably secure said support member to the railing.

8. The device of claim 1, wherein said cylindrical member is tubular and includes a reinforcement member therein to provide additional longitudinal strength to said cylindrical member.

9. A bird anti-perching device for discouraging birds from perching on a surface, comprising:

two spaced-apart support members;

a rotatable cylindrical member extending between said two support members and capable of rotating freely if a bird lands thereon, thereby to form an unstable perch;

said rotatably cylindrical member comprising a tubular portion having opposed closed ends with bores in said closed ends coaxial with said tubular portion, said support members having pin members extending therefrom for cooperation with said bores whereby the cylindrical member can freely rotate;

a reinforcement member being located within said tubular portion to provide additional longitudinal strength to said cylindrical member;

said reinforcement member being a T-shaped member having tapered ends so that the T-shaped member does not interfere with a pin member of said support member.

10. The device of claim 9, wherein said closed ends have low coefficient of friction bushings defining said bores.

11. A cylindrical member for a bird anti-perching device comprising an elongate tubular portion and opposed end caps secured to opposite ends of said tubular portion, each said end cap having a coaxial bore defined by a low coefficient of friction bushing member;

a T-shaped reinforcement member within said tubular portion and sized and configured to avoid contact with a pin supporting member associated with said bores.

12. A support for a bird anti-perching device comprising an L-shaped portion having a horizontal leg and a vertical leg, said vertical leg having pin means extending outwardly therefrom and adapted to support a cylindrical member of the anti-perching device and an inverted U-shaped portion having a bight portion and two leg portions, the bight portion of the U-shaped portion being secured to the horizontal leg of said L-shaped portion intermediate the free end of said horizontal leg and said vertical leg, the leg portions of the inverted U-shaped portion extending in a direction opposite to that of said vertical leg and having means below said horizontal leg for detachably securing the support to a surface in contact with said horizontal leg.

13. The support of claim 12, wherein the means for detachably securing the support comprises means to clamp said horizontal leg to a railing surface.

14. The support of claim 12, wherein the means for detachably securing the support comprises means to secure said horizontal leg to a surface by a hook and loop fabric fastener.

15. A cylindrical member for a bird anti-perching device comprising an elongate tubular portion and opposed end caps secured to opposite ends of said tubular portion, each said end cap having a coaxial bore defined by a low coefficient of friction bushing member; and a reinforcement member within said tubular portion and sized and configured to avoid contact with a pin supporting member associated with said bores.

* * * * *